(12) United States Patent
Baranowski et al.

(10) Patent No.: US 12,427,723 B2
(45) Date of Patent: Sep. 30, 2025

(54) SYSTEM AND METHOD FOR THE ADDITIVE MANUFACTURE OF COMPONENTS

(71) Applicant: Ford Global Technologies, LLC, Dearborn, MI (US)

(72) Inventors: Thomas Baranowski, Würselen (DE); Maik Broda, Würselen (DE); Markus Franzen, Stolberg (DE); Pascal Rebmann, Weilerswist (DE)

(73) Assignee: Ford Global Technologies, LLC, Dearborn, MI (US)

( * ) Notice: Subject to any disclaimer, the term of this patent is extended or adjusted under 35 U.S.C. 154(b) by 542 days.

(21) Appl. No.: 17/375,369

(22) Filed: Jul. 14, 2021

(65) Prior Publication Data

US 2022/0016848 A1 Jan. 20, 2022

(30) Foreign Application Priority Data

Jul. 14, 2020 (DE) .......................... 102020118492.1

(51) Int. Cl.
| | | |
|---|---|---|
| *B29C 64/393* | (2017.01) | |
| *B29C 64/209* | (2017.01) | |
| *B33Y 30/00* | (2015.01) | |
| *B33Y 50/02* | (2015.01) | |
| *G06T 7/00* | (2017.01) | |
| *G06T 7/60* | (2017.01) | |

(52) U.S. Cl.
CPC .......... *B29C 64/393* (2017.08); *B29C 64/209* (2017.08); *B33Y 50/02* (2014.12); *G06T 7/001* (2013.01); *G06T 7/60* (2013.01); *B33Y 30/00* (2014.12); *G06T 2207/30164* (2013.01)

(58) Field of Classification Search
None
See application file for complete search history.

(56) References Cited

U.S. PATENT DOCUMENTS

| | | | |
|---|---|---|---|
| 10,427,348 B2 | 10/2019 | Perez et al. | |
| 2015/0323318 A1* | 11/2015 | Hess | H04N 23/56 348/47 |
| 2016/0368219 A1* | 12/2016 | Lubin | B29C 64/112 |

(Continued)

FOREIGN PATENT DOCUMENTS

CN 109676135 4/2019

*Primary Examiner* — Ryan A Jarrett
(74) *Attorney, Agent, or Firm* — Burris Law, PLLC

(57) ABSTRACT

A system includes at least one electronic controller configured to generate machine code based on a predetermined component geometry associated with a component and at least one printing device. The system includes a comparison system comprising at least one recording device configured to record a geometry of the component using one of a strip projection routine and a white-light interferometry routine and at least one comparison controller configured to compare the geometry of the component with the predetermined component geometry. When a deviation exceeds a predetermined limit value, the at least one comparison controller is configured to generate modification information and deliver the modification information to the at least one electronic controller. The at least one electronic controller is configured to modify the machine code based on the modification information and to deliver the modified machine code to the printing device.

20 Claims, 2 Drawing Sheets

(56) References Cited

U.S. PATENT DOCUMENTS

Figure 1:
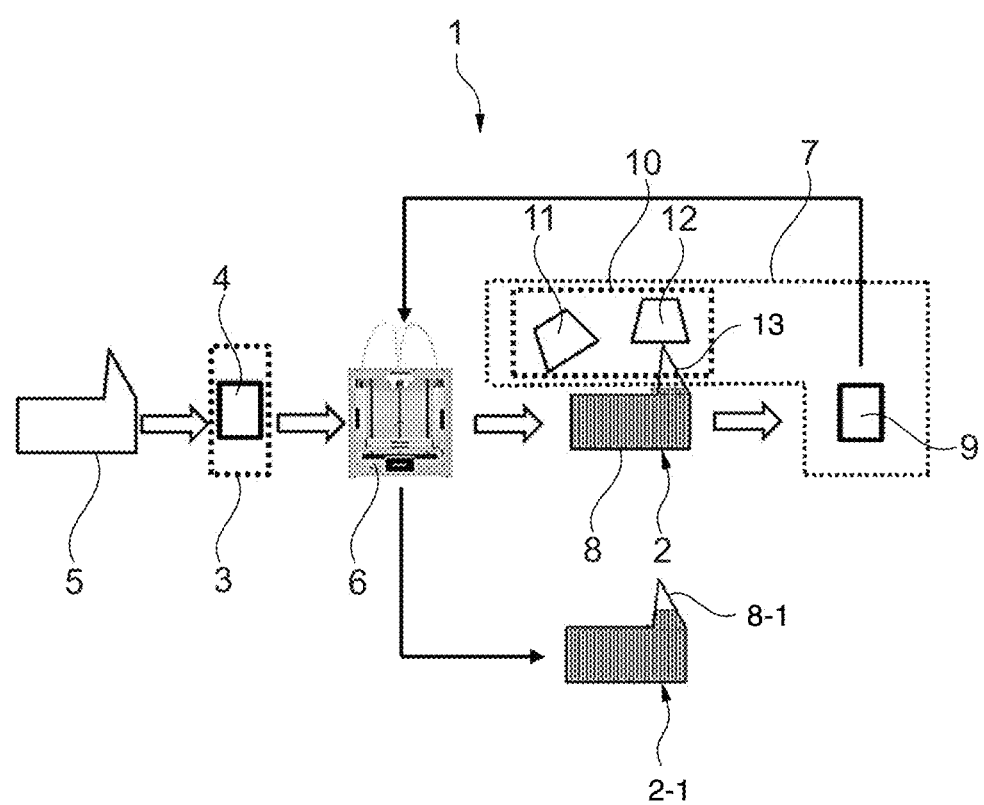

2017/0050382 A1    2/2017   Minardi et al.
2019/0001574 A1    1/2019   Yackabonis et al.
2019/0054700 A1    2/2019   Chandar et al.
2021/0026323 A1*   1/2021   Chen ....................... G06F 30/23

* cited by examiner

SYSTEM AND METHOD FOR THE ADDITIVE MANUFACTURE OF COMPONENTS

CROSS-REFERENCE TO RELATED APPLICATIONS

This application claims priority to and the benefit of German Patent Application No. 102020118492.1, filed on Jul. 14, 2020. The disclosure of the above application is incorporated herein by reference.

FIELD

The present disclosure relates to an additive manufacturing system and a method for manufacturing a component using the additive manufacturing system.

BACKGROUND

The statements in this section merely provide background information related to the present disclosure and may not constitute prior art.

An additive manufacturing method or a three-dimensional (3D) printing method in which a component may be constructed in layers using a fusible material may include, for example, fused filament fabrication (FFF). This method may be used for modeling, prototyping, and producing applications. In one form, plastic materials having plastic filaments or metal materials having metal wires may be unwound from a spool and continuously melted inside a printing head of a 3D printing apparatus to provide the material for the additive manufacture of a component.

Information relating to process parameters and to tracking a movement of a printing head are conventionally provided in a geometric code (hereinafter referred to as "G-code") data packet, which is imported into a 3D printing apparatus comprising the printing head. Accordingly, the predetermined printing task that is provided in the G-code data packet may define the production.

Because of external constraints, a geometry of a printed component may deviate from a desired component geometry. The deviation may occur due to shrinkage, warping, or machine-related errors. If adaptation of the printing process is not performed, the component continues to be printed until it is fully manufactured, and the dimensions of the finished component may not be checked until after the manufacture is complete.

If the deviation of the geometry of the finished component relative to the desired component geometry is greater than a threshold amount, the execution of the printing task may be aborted. In one form, the G-code data packet may be adapted, and the printing task may be repeated using the adapted G-code data packet. This results in lost time and lost resources. Furthermore, termination of an ongoing printing task results in a loss of material and time.

Chinese Patent Publication No. CN 109676135A discloses an online monitoring and error-repair apparatus for an additive manufacturing method. The apparatus comprises an additive manufacturing apparatus, an image acquisition apparatus, a signal-processing apparatus, and a feedback control apparatus. With the apparatus, surface defects of the metal component being manufactured are monitored in real time during a production process, and the feedback control apparatus sends the shape quality of the metal component being manufactured to the signal-processing unit in real time.

United States Pat. Pub. No. 2019/0054700 discloses an additive manufacturing system in which at least a first 3D printing process for at least partial production of a component is performed, at least one measured dimension of the at least partially produced component is measured, and the at least one measured dimension is compared with at least one corresponding nominal dimension. Furthermore, at least one regression model is generated in response to the at least one comparison.

U.S. Pat. No. 10,427,348 discloses an automatic process control for additive manufacture. A system used therefor comprises additive manufacturing equipment for producing an object and a local network computer controlling the apparatus. At least one camera detects a production volume of the equipment order to generate images of the object that are accessible via a network. The computer is programmed such that the production process is stopped if the images reveal that the object is defective.

United States Pat. Pub. No. 2017/0050382 discloses a 3D printer and a 3D printing method. The method comprises reception of a 3D model of an object to be printed, reception of information including the material properties of the materials to be extruded, and generation of a set of sensor-based printer control parameters to print the object with the 3D printer at least partially based on sensor inputs.

United States Pat. Pub. No. 2019/0001574 discloses a system and a method for determining dynamic forces in a liquefying system during additive manufacture. The method comprises reception of motor data for a drive motor which presses a solid material in the direction of a liquefying zone of the liquefying system, the motor data comprising at least one data point per instruction code of a set of instruction codes which are sent to the additive manufacture. The method furthermore comprises reception of printing data which are assigned to the liquefying zone of the liquefying system, the printing data containing at least one data point per instruction code of the set of instruction codes. The method also comprises analysis of the motor data and of the printing data for the set of instruction codes and output of a result of the analysis to facilitate the further 3D printing by means of a 3D printer by using the solid material.

SUMMARY

This section provides a general summary of the disclosure and is not a comprehensive disclosure of its full scope or all of its features.

A system for additively manufacturing a component includes at least one electronic controller configured to generate machine code based on a predetermined component geometry associated with the component, at least one printing device configured to perform an additive manufacturing routine on the component based on the machine code, and a comparison system. The comparison system includes at least one recording device and at least one comparison controller, wherein the at least one recording device is configured to record a geometry of the component using one of a strip projection routine and a white-light interferometry routine, and wherein the at least one comparison controller is configured to compare the geometry of the component with the predetermined component geometry. When a deviation of the geometry of the component from the predetermined component geometry exceeds a predetermined limit value, the at least one comparison controller is configured to generate modification information and deliver the modification information to the at least one electronic controller. The at least one electronic controller is configured to modify the machine code based on the modification information and to deliver the modified machine code to the printing device.

The disclosure provides a method for additively manufacturing a component that includes generating machine code based on a predetermined component geometry associated with the component. The method includes creating, via additively manufacturing, the component based on the machine code, recording a geometry of the component using one of a strip projection routine and a white-light interferometry routine, comparing the geometry of the component with the predetermined component geometry, generating modification information when a deviation of the geometry from the component geometry exceeds a predetermined limit value, and modifying the machine code based on the modification information.

The present disclosure provides a system for additively manufacturing a component includes at least one electronic controller configured to generate machine code based on a predetermined component geometry associated with the component, at least one printing device configured to perform an additive manufacturing routine on the component based on the machine code, and a comparison system. The comparison system includes at least one recording device and at least one comparison controller, wherein the at least one recording device is configured to record the geometry of the component using one of a strip projection routine and a white-light interferometry routine, and wherein the at least one comparison controller configured is to compare the geometry of the component to the predetermined component geometry. When the component is in at least a partially manufactured state and when a deviation of the geometry of the component from the predetermined component geometry exceeds a threshold value, the at least one comparison controller is configured to generate modification information and deliver the modification information to the at least one electronic controller. The at least one electronic controller is configured to modify the machine code based on the modification information and to deliver the modified machine code to the printing device.

It should be noted that the features mentioned individually in the following description may be combined with one another in any desired technologically feasible way and represent further configurations of the disclosure.

In one form, the geometry of the at least partially manufactured component is recorded using a strip projection method or a white-light interferometry method during or after performing a printing task and the machine code generated based on the predetermined component geometry of the component. The method of the present disclosure provides a high degree of accuracy and optimizes the additive manufacture of components.

If the recording is performed during the printing task (i.e., online), an electronic comparison unit may compare the geometry of the at least partially manufactured component with the component geometry, and the comparison unit may check whether the geometry deviates by a deviation of the geometry from the component geometry and whether the deviation exceeds a predetermined limit value. If the recording is performed during the printing task, the comparison unit may generate the modification information, the comparison unit may transmit the modification information to the electronic unit if the geometry deviates from the component geometry by a deviation exceeding the predetermined limit value, and the electronic unit may modify the machine code based on the modification information and transmit the modified machine code to a printing device.

Accordingly, the modified machine code can be generated and used for the manufacture of the component while performing the printing task. It is therefore possible to reliably prevent components from being manufactured with a defective geometry, and the additive manufacture process of the present disclosure has enhanced efficiency, enhanced control, and/or enhanced regulation. The increased efficiency of the additive manufacture process results from a decreased loss of time and material. By modifying the machine code online, the additive manufacturing process may be adapted in a versatile way, which therefore leads to an increased efficiency due to material and time savings. The present disclosure therefore provides for additive manufacturing with enhanced geometrical manufacturing accuracy.

To perform the strip projection method, the recording unit may include at least one strip projector that illuminates the at least partially manufactured component with parallel light strips that are separated from one another in pairs by nonilluminated dark strips. Furthermore, the recording system may include at least one camera that records the strip pattern projected onto the component at a known viewing angle with respect to the projection direction.

To perform the white-light interferometry method, the recording device may comprise at least one white-light interferometer and at least one charge-coupled device (CCD) sensor. The light of the light source of the white-light interferometer may be collected by a converging lens, coupled into a beam path, and split by a beam splitter into a reference beam and a measurement beam. The reference beam may be reflected by a reference mirror, and the measurement beam may be reflected by the surface of the component. The reflected light beams may be forwarded by the beam splitter to the CCD sensor and form an interference signal as a function of the position of the component for each individual pixel of the CCD sensor.

In one form, the machine code may be partially or fully provided as G-code. The predetermined component geometry of the component may be provided to preprocessing software, which decomposes the component geometry into theoretically slices, layers, or levels (slicing). The preprocessing software generates a track suitable for implementing the corresponding decomposed component geometry of a printing head of the printing device as machine code and, more particularly, G-code. The preprocessing software may, for example, be executed by the electronic unit.

In one form, the printing device may manufacture the component as a function of the machine code, and the printing device may, for example, be conventionally formed. The printing device may also be referred to herein as a "3D printer."

In one form, the electronic comparison unit may compare the geometry of the partially or fully manufactured component with the predetermined component geometry to determine whether the component satisfies given geometrical specifications. In one form, the comparison unit may compare the entire geometry of the component with the entire component geometry. Alternatively, the comparison unit may be configured to compare only a section of the geometry of the component with a corresponding section of the component geometry. If the geometry of the component deviates from the predetermined component geometry by a deviation exceeding the predetermined limit value, the comparison unit may be configured to generate corresponding local modification information and deliver the modification information to the electronic unit. The modification information may, for example, be provided as machine code and, more particularly, G-code. The machine code representing the modification information and the original machine code are linked with one another at the correct position so that manufacturing errors resulting from inaccurate linking of the machine code is inhibited. In one form, the linking of the machine code may also be performed by the electronic unit.

In one form, after receiving the modification information, the electronic unit may modify the machine code as a function of the modification information. This modification may be performed by partial, local, or complete replacement of the machine code with a new machine code. By using the modified machine code, the printing device may manufacture a component that satisfies the original requirements with respect to geometrical tolerances.

In one form, the additive manufacturing system may be configured to perform an FFF method. The disclosure is not, however, limited to an FFF method. The additive manufacturing routine of the present disclosure has a high process reliability since a printing task may be interrupted if problems occur. The additive manufacturing system according to the disclosure may be configured to perform machine learning routines so that the accuracy is further improved.

In one form, the comparison unit is configured to generate the modification information and deliver it to the electronic unit if the geometry deviates from the component geometry by a value that is within a tolerance range, such as a range of 0.1% to 10%. Depending on the required manufacturing accuracy, the range may be set to a particular percentage range of volumetric deviations. For higher manufacturing accuracy, the range may, for example, be set to 0.1% to 1%. For medium required manufacturing accuracy, the range may, for example, be set to 1% to 5%. For lower manufacturing accuracy, the range may, for example, be set to 5% to 10%.

In one form, the predetermined limit value is provided as a theoretical envelope around the component geometry or as a spatial point of the theoretical envelope. This form may compensate for deviations that result from uniform shrinkage or extrusion of the used material. The theoretical envelope may be formed by a plurality of predetermined limit values or spatial points. If a point or a section of the geometry of the component lies outside the theoretical envelope, the point or the section exceeds the respective predetermined limit value. The theoretical envelope may, for example, enclose a component geometry theoretically decomposed into slices. The theoretical envelope may approximate an outer surface of a uniformly shrunk or stretched component. Maximum deviations from the theoretical envelope may be recorded in the X direction, Y direction and Z direction.

In one form, the predetermined limit value is a magnitude of a position vector of a spatial point of the theoretical envelope. In this form, the recorded measurement value may be provided as a magnitude to compare the magnitude of the position vector with the magnitude of the measurement value.

In one form, the component geometry is provided as a standard tessellation language (STL) data model or of a slice model of the component to be manufactured. The recorded geometry of the component may thus be compared with an STL data model or a slice model of the component to establish a deviation of the geometry from the component geometry.

In one form, the electronic unit is configured to modify the machine code such that a printing head of the printing device is moved with an offset when the modified machine code is executed by the printing device. In one form, the electronic unit is configured to vary a width and/or number of material tracks to be printed when the modified machine code is executed by the printing device. In one form, the electronic unit is configured to decompose at least one layer of the component geometry into theoretical slices by using a geometrical error recorded by the recording unit.

As a result of the offset movement of the printing head when executing the modified machine code, a deviation of the geometry of the component from the predetermined component geometry may be compensated for by the printing head being moved differently to avoid the geometry deviation of the preceding manufacturing process using the unmodified machine code.

Additionally or alternatively, the compensation for a deviation of the geometry of the component from the predetermined component geometry may be performed by a variation or change of the width and/or number of material tracks to be printed when executing the modified machine code with reference to executing the unmodified machine code. These material tracks are produced by a movement of the printing head along a movement track of the printing head following from the modified machine code, and a movement speed may be optionally varied or simultaneously changed to influence the width and/or height of the material tracks. The variation of the width and/or height of the material tracks may, for example, be used to produce detailed structures of the component.

Additionally or alternatively, to compensate for a deviation of the geometry of the component from the predetermined component geometry, at least one layer of the component geometry may be theoretically decomposed into slices using a geometrical error recorded by the recording unit to produce an improved surface of the component.

The advantages described herein regarding the system are associated with the method, and the advantages described herein regarding the method are associated with the system. In one form, the system according to one of the forms mentioned above or a combination of at least two of these forms with one another may be used to perform the method.

Further areas of applicability will become apparent from the description provided herein. It should be understood that the description and specific examples are intended for purposes of illustration only and are not intended to limit the scope of the present disclosure.

DRAWINGS

Figure 2:
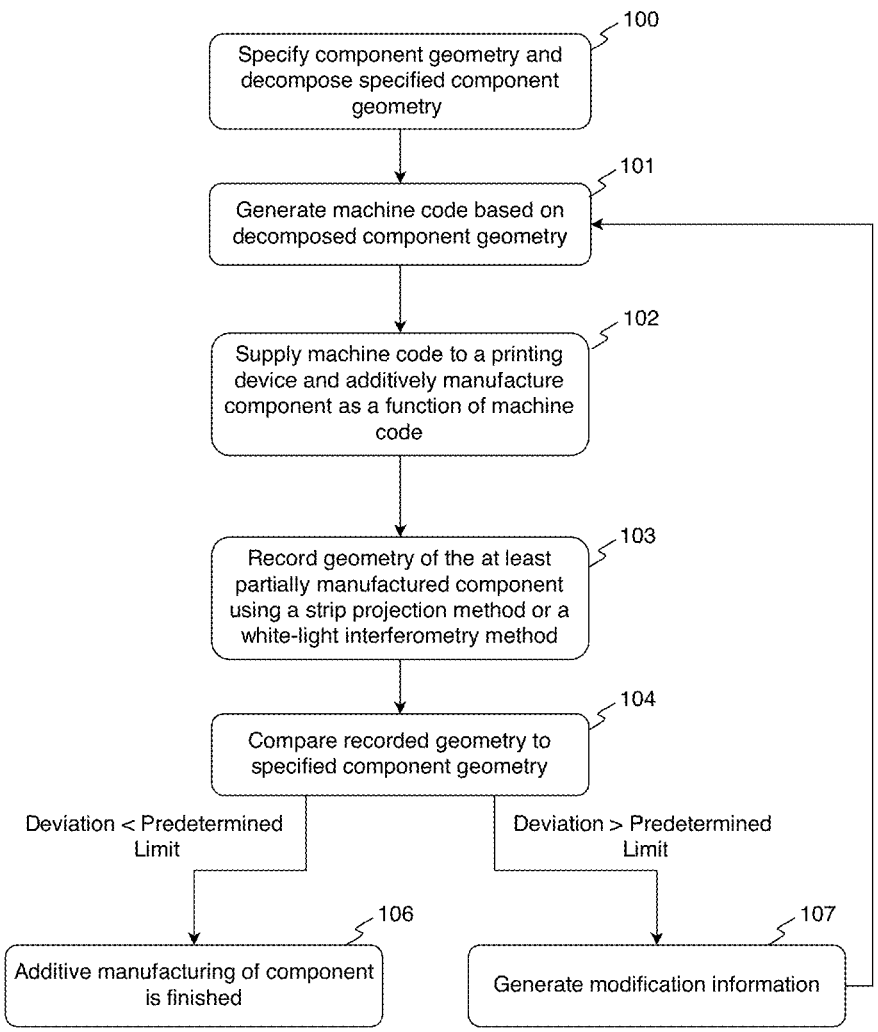

Further advantageous configurations of the disclosure are disclosed in the dependent claims and the following description of the figures, in which FIG. 1 illustrates a schematic representation of an additive manufacturing system according to the disclosure, and FIG. 2 is a flowchart of an additive manufacturing process according to the disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a schematic representation of a system 1 configured to perform an additive manufacture process on components 2 to be manufactured is shown. A layer structure of the respective component 2 is shown in FIG. 1.

In one form, the system 1 comprises an electronic controller 3 for generating a machine code 4 based on a predetermined component geometry 5 of the component 2. That is, the machine code 4 is for a printing device 6 configured to print the component 2. The component geometry 5 may be provided in the form of an STL data model or a slice model of the component 2.

In one form, the system 1 comprises a printing device 6 configured to perform the additive manufacture process on the component 2 as a function of the machine code 4 generated by the electronic controller 3.

In one form, the system 1 comprises an electronic comparison system 7 for comparing a geometry 8 of the component 2 when it is partially manufactured with the predetermined component geometry 5. In one form, the electronic comparison system 7 is configured to generate modification information 9 and deliver it to the electronic controller 3 when a deviation of the geometry 8 from the component geometry 5 exceeds a predetermined limit value. In one form, the electronic comparison system 7 comprises a recording device 10 that records the geometry 8 using a strip projection method. In one form, the recording device 10 comprises a strip projector 11 configured to generate light strips 13 and a camera 12. In one form, the predetermined limit value may be provided as a theoretical envelope around the component geometry 5 or as a spatial point of the theoretical envelope. Alternatively, the predetermined limit value may be a magnitude of a position vector of a spatial point of the theoretical envelope. In one form, the modification information 9 may be provided as G-code.

In one form, the electronic comparison system 7 may be configured to generate the modification information 9 and deliver it to the electronic controller 3 if the geometry 8 deviates from the component geometry 5 by a value that is within a range of 0.1% to 10%.

In one form, the electronic controller 3 is configured to modify the machine code 4 as a function of the modification information 9 and to deliver the modified machine code to the printing device 6. In this form, the electronic controller 3 may be configured to modify the machine code 4 such that a printing head (not shown) of the printing device 6 is moved with an offset when the modified machine code is executed by the printing device 6. In one form, the electronic controller 3 is configured to vary a width and/or number of material tracks (not shown) to be printed when the modified machine code is executed by the printing device 6. In one form, the electronic controller 3 is configured to theoretically decompose at least one layer of the component geometry 5 into slices using a geometrical error recorded by the recording device 10.

By using the modified machine code, the printing device 6 produces a component 2-1, and a geometry 8-1 of is the component 2-1 is more similar to the predetermined component geometry 5 than the geometry 8 of the component 2.

Referring to FIG. 2 is a flowchart of an additive manufacture routine for components is shown.

At step 100, the routine includes specifying a component geometry and theoretically decomposing the specified component geometry. In one form, STL data model or a CAD data model of the component may be used as the predetermined component geometry, and the predetermined component geometry may be decomposed into slices, layers, or levels.

At step 101, the routine generates a machine code for the component based on the decomposed component geometry.

At step 102, the routine supplies the machine code to a printing device, and the routine additively manufactures the component as a function of the machine code.

At step 103, the routine records a geometry of the at least partially manufactured component using a strip projection method or a white-light interferometry method.

At step 104, the routine compares the recorded geometry to the machine code-based component geometry generated at step 101. If a deviation of the geometry from the machine code-based component geometry does not exceed a predetermined limit value at step 104, the routine determines the component is finished at step 106. If a deviation of the geometry from the machine code-based component geometry exceeds the predetermined limit value at step 104, however, the routine generates modification information at step 107 and supplies the modification information to step 101 to modify the original machine code as a function of the modification information and to generate a modified machine code, which is utilized to finish the component at step 102.

In this form, the modification information may be generated if the geometry deviates from the machine code-based component geometry by a value that is within a range of 0.1% to 10%. In one form, a theoretical envelope around the component geometry, a spatial point of the theoretical envelope, or a magnitude of a position vector of a spatial point of the theoretical envelope may be used as the predetermined limit value.

In one form, at step 101, the machine code may be modified such that a printing head of the printing device is moved with an offset when the modified machine code is executed at step 102 by the printing device. In one form, the machine code may be modified such that a width and/or number of material tracks to be printed is varied when the modified machine code is executed at step 102 by the printing device. In one form, machine code may be modified such that at least one layer of the component geometry is theoretically decomposed into slices, layers, or levels using a geometrical error recorded by the recording unit.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "unit," "controller," and "comparison system" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for additively manufacturing a component, the system comprising:
   at least one electronic controller configured to generate machine code for the component based on a predetermined component geometry associated with the component;
   at least one printing device configured to perform an additive manufacturing routine associated with a partial manufacturing of the component based on the machine code; and
   a comparison system comprising at least one recording device and at least one comparison controller, wherein the at least one recording device is configured to record a geometry of the partially manufactured component using a strip projection routine, wherein the at least one comparison controller is configured to compare the recorded geometry of the partially manufactured component to the predetermined component geometry by comparing a magnitude of a position vector with a magnitude of a value corresponding to the recorded geometry of the partially manufactured component,
   wherein, in response to a deviation of the recorded geometry of the partially manufactured component from the predetermined component geometry exceeding a predetermined limit value, the at least one comparison controller is configured to generate modification information and deliver the modification information to the at least one electronic controller, wherein the predetermined limit value is the magnitude of the position vector of a spatial point of a theoretical envelope around a predetermined component geometry,
   wherein the at least one electronic controller is further configured to modify the machine code based on the modification information and to deliver the modified machine code to the printing device, and
   wherein the at least one printing device is further configured to complete the partially manufactured component based on the modification of the machine code.

2. The system according to claim 1, wherein the at least one comparison controller is configured to generate the modification information when the geometry of the component deviates from the predetermined component geometry by a value that is within a range of 0.1% to 10%.

3. The system according to claim 1, wherein the predetermined limit value is one of a theoretical envelope around the predetermined component geometry and a spatial point of the theoretical envelope.

4. The system according to claim 1, wherein the predetermined component geometry is one of a standard tessellation language (STL) data model of the component and a slice model of the component.

5. The system according to claim 1, wherein the printing device comprises a printing head, and wherein:
   the at least one electronic controller is configured to modify the machine code such that the printing head is moved with an offset when the modified machine code is executed by the printing device;
   the at least one electronic controller is configured to vary at least one of a width of material tracks and a number of material tracks when the modified machine code is executed by the printing device; and
   the at least one electronic controller is configured to decompose at least one layer of the predetermined component geometry into theoretical slices based on a geometrical error recorded by the recording device.

6. The system according to claim 1, wherein the at least one recording device is further configured to record the geometry of the component using a white-light interferometry routine.

7. The system of claim 1, wherein the at least one electronic controller is further configured to:
   generate a track based on the predetermined component geometry, wherein the predetermined component geometry is decomposed into theoretical slices, layers, levels, or a combination thereof.

8. A method for additively manufacturing a component, the method comprising:
   generating machine code for the component based on a predetermined component geometry associated with the component, wherein the predetermined component geometry is decomposed into theoretical slices, layers, levels, or a combination thereof;
   creating, via an additive manufacturing routine, a partial manufacturing of the component based on the machine code;
   recording a geometry of the partially manufactured component using a strip projection routine;
   comparing the recorded geometry of the partially manufactured component to the predetermined component geometry by comparing a magnitude of a position vector with a magnitude of a value corresponding to the recorded geometry of the partially manufactured component;
   generating modification information in response to a deviation of the recorded geometry of the partially manufactured component from the predetermined component geometry exceeding a predetermined limit value, wherein the predetermined limit value is the magnitude of the position vector of a spatial point of a theoretical envelope around a predetermined component geometry; and modifying the machine code based on the modification information, wherein the partially manufactured component is completed based on the modification of the machine code.

9. The method according to claim 8, wherein the modification information is generated when the geometry of the component deviates from the predetermined component geometry by a value that is within a range of 0.1% to 10%.

10. The method according to claim 8, wherein the predetermined limit value is one of a theoretical envelope around the predetermined component geometry and a spatial point of the theoretical envelope.

11. The method according to claim 8, wherein the predetermined component geometry is one of a standard tessellation language (STL) data model of the component and a slice model of the component.

12. The method according to claim 8 further comprising:
modifying the machine code such that a printing head is moved with an offset when the modified machine code is executed by a printing device comprising the printing head;
varying at least one of a width of material tracks and a number of material tracks when the modified machine code is executed by the printing device; and
decomposing at least one layer of the predetermined component geometry into theoretical slices based on a geometrical error recorded by a recording device.

13. The method according to claim 8, wherein the recordation of the geometry of the component further uses a white-light interferometry routine.

14. The method of claim 8, further comprising:
generating a track based on the predetermined component geometry.

15. A system for additively manufacturing a component, the system comprising:
at least one electronic controller configured to generate machine code for the component based on a predetermined component geometry associated with the component;
at least one printing device configured to perform an additive manufacturing routine associated with a partial manufacturing of the component based on the machine code; and
a comparison system comprising at least one recording device and at least one comparison controller, wherein the at least one recording device is configured to record a geometry of the partially manufactured component using a strip projection routine, wherein the at least one comparison controller is configured to compare the recorded geometry of the partially manufactured component to the predetermined component geometry by comparing a magnitude of a position vector with a magnitude of a value corresponding to the recorded geometry of the partially manufactured component, wherein:
when the component is in at least a partially manufactured state and in response to a deviation of the recorded geometry of the partially manufactured component from the predetermined component geometry exceeding a threshold value, the at least one comparison controller is configured to generate modification information and deliver the modification information to the at least one electronic controller, wherein the threshold value is the magnitude of the position vector of a spatial point of a theoretical envelope around a predetermined component geometry,
the at least one electronic controller is further configured to modify the machine code based on the modification information and to deliver the modified machine code to the printing device, and
the at least one printing device is further configured to complete the partially manufactured component based on the modification of the machine code.

16. The system according to claim 15, wherein the at least one comparison controller is configured to generate the modification information when the geometry of the component deviates from the predetermined component geometry by a value that is within a range of 0.1% to 10%.

17. The system according to claim 15, wherein the threshold value is one of a theoretical envelope around the predetermined component geometry and a spatial point of the theoretical envelope.

18. The system according to claim 15, wherein the predetermined component geometry is one of a standard tessellation language (STL) data model of the component and a slice model of the component.

19. The system according to claim 15, wherein the printing device comprises a printing head, and wherein:
the at least one electronic controller is configured to modify the machine code such that the printing head is moved with an offset when the modified machine code is executed by the printing device;
the at least one electronic controller is configured to vary at least one of a width of material tracks and a number of material tracks when the modified machine code is executed by the printing device; and
the at least one electronic controller is configured to decompose at least one layer of the predetermined component geometry into theoretical slices based on a geometrical error recorded by the recording device.

20. The system of claim 15, wherein the at least one electronic controller is further configured to:
generate a track based on the predetermined component geometry, wherein the predetermined component geometry is decomposed into theoretical slices, layers, levels, or a combination thereof.

* * * * *